United States Patent
Chen et al.

(10) Patent No.: US 7,743,977 B2
(45) Date of Patent: Jun. 29, 2010

(54) METHOD AND SYSTEM FOR RANDOM DATA ACCESS FOR SECURITY APPLICATIONS

(75) Inventors: Xuemin Chen, San Diego, CA (US); Iue-Shuenn I. Chen, San Diego, CA (US); Francis Chi-Wai Cheung, Del Mar, CA (US); Longyin Wei, San Diego, CA (US)

(73) Assignee: Broadcom Corporation

( * ) Notice: Subject to any disclaimer, the term of this patent is extended or adjusted under 35 U.S.C. 154(b) by 1000 days.

(21) Appl. No.: 11/069,204

(22) Filed: Feb. 28, 2005

(65) Prior Publication Data

US 2006/0195691 A1    Aug. 31, 2006

(51) Int. Cl.
*G06Q 40/00* (2006.01)
*G07D 11/00* (2006.01)
*G07F 19/00* (2006.01)

(52) U.S. Cl. .................. 235/379; 235/375; 235/382; 713/178; 713/179

(58) Field of Classification Search .......... 235/379, 235/476, 487, 376, 382, 375; 713/163–170, 713/176, 194, 189–193; 705/67, 41
See application file for complete search history.

(56) References Cited

U.S. PATENT DOCUMENTS

| | | | | |
|---|---|---|---|---|
| 5,383,134 A | * | 1/1995 | Wrzesinski | ............. 340/870.03 |
| 6,757,835 B2 | * | 6/2004 | Kano et al. | ................. 713/340 |
| 6,839,847 B1 | * | 1/2005 | Ohki et al. | ................... 713/194 |
| 6,968,354 B2 | * | 11/2005 | Kaminaga et al. | ........... 708/491 |
| 7,124,296 B2 | * | 10/2006 | Krishna et al. | .............. 713/161 |
| 2002/0154767 A1 | * | 10/2002 | Endo et al. | ..................... 380/28 |
| 2003/0085286 A1 | * | 5/2003 | Kelley et al. | ................. 235/492 |
| 2004/0025028 A1 | * | 2/2004 | Takeuchi | ..................... 713/184 |
| 2004/0031857 A1 | * | 2/2004 | Sato | ........................... 235/492 |
| 2004/0059916 A1 | * | 3/2004 | Mizushima et al. | ......... 713/172 |
| 2004/0065730 A1 | * | 4/2004 | Lin | ............................. 235/380 |
| 2005/0081040 A1 | * | 4/2005 | Johnson et al. | ............. 713/176 |
| 2006/0010183 A1 | * | 1/2006 | Rabin et al. | ................. 708/250 |

* cited by examiner

*Primary Examiner*—Edwyn Labaze
(74) *Attorney, Agent, or Firm*—McAndrews, Held & Malloy, Ltd.

(57) ABSTRACT

Methods and systems for random data access for security applications are disclosed and may comprise generating on a chip, a random process index. A data process may be randomly selected on the chip utilizing the generated random process index. A time interval may be randomly allocated on the chip. After the time interval, the randomly selected data process may initiate processing of data. The processing of the data may comprise accessing the data and/or acquiring the data. The data may be verified by the selected data process prior to the processing of the data. The data may be verified utilizing a digital signature verification algorithm, for example.

30 Claims, 5 Drawing Sheets

METHOD AND SYSTEM FOR RANDOM DATA ACCESS FOR SECURITY APPLICATIONS

RELATED APPLICATIONS

Not Applicable

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to securely handling processing of information. More specifically, certain embodiments of the invention relate to a method and system for random data access for security applications, including security applications using memory access schemes.

BACKGROUND OF THE INVENTION

In many security applications, it may be required that certain data stored in one or more memory regions be continuously, or periodically, monitored and analyzed by a security client to ensure the integrity of the data in these regions of memory. Such security protocol may ensure that the content stored in memory has not been changed, replaced, or in any way tampered with, by piracy attempts and/or unauthorized users.

With regard to robust protection against signal piracy, information bearing signals should be protected so as to eliminate unauthorized interception and access by a third party. Some conventional signal security methods utilize signal scrambling where the scrambled signal content is not readily discernable by a receiving party. Efficient scrambling of different kinds of signals such as multimedia broadcasts, for example, may be achieved in such a manner that there is no perceptible deterioration in signal quality when these signals are being restored. With either a conditional access (CA) system or a copy protection system, private (secure) keys may be utilized for scrambling and descrambling high-value content or for protecting highly sensitive transactions. In a CA system, a content scrambling key is utilized and this content scrambling key has to be protected.

For a complex computer or set-top box (STB) System on Chip (SoC), there may be many clients in the SoC which access the memory for fetching instructions and/or data, for example. Such clients within the SoC may be adapted to access the memory through a memory bus. An unauthorized user may attempt to tap into the memory bus from outside of the SoC in order to monitor the data access patterns of the SoC clients and to attempt an unauthorized signal access. Monitoring the data access patterns of the SoC clients may enable the unauthorized user to determine which data access is for security check by a security client, for example, ultimately allowing the unauthorized user to circumvent security protocol and gain unauthorized data access.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for random data access for security applications, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for random data access for security applications. In an exemplary aspect of the invention, unauthorized data access may be prevented by securely handling processing of information utilizing randomized access time of an on-chip client to data stored in memory. Further, data processes within the on-chip client may be selected at random to access data stored in memory. The burstiness of the data access by a randomly selected process in the on-chip client may be approximately equal to the burstiness of data acquired by one or more other on-chip clients.

In accordance with an embodiment of the invention, a random number generator may be utilized to generate, on a chip, a random process index for a plurality of processes on the chip. A data process may be randomly selected on the chip utilizing the generated random process index. A time interval may be randomly allocated on the chip. After the time interval has elapsed, the randomly selected data process may initiate processing of data. The processing of the data may comprise accessing the data and/or acquiring the data. The data may be verified by the selected data process prior to the processing of the data. The data may be verified utilizing a digital signature verification algorithm, for example.

Figure 1A:
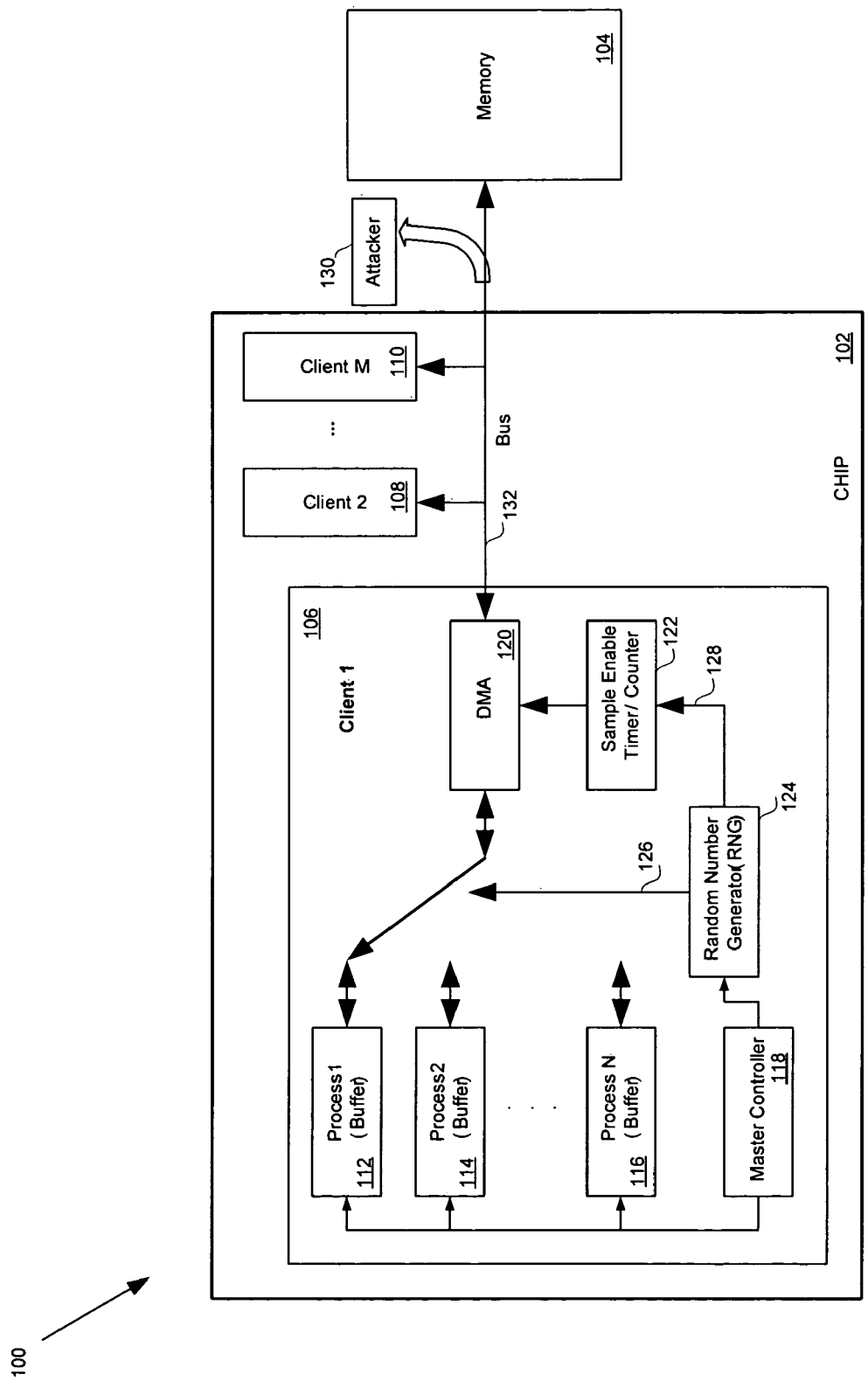
FIG. 1a is a block diagram illustrating an exemplary system for securely handling processing of information, in accordance with an embodiment of the invention.

FIG. 1a is a block diagram illustrating an exemplary system for securely handling processing of information, in accordance with an embodiment of the invention. Referring to FIG. 1a, the exemplary system 100 may comprise an integrated chip 102 and memory 104. The integrated chip 102 may comprise a complex computer or set-top box System on Chip (SoC), for example. The SoC 102 may comprise a plurality of clients, $client_1$ 106, $client_2$ 108, ..., $client_m$ 110.

Each of the m-number of clients 106, ..., 110 may comprise suitable circuitry, logic, and/or code and may be adapted to perform a dedicated function within the SoC 102. For example, client 106 may comprise a security checking client. Other exemplary clients may comprise a video decoder client, an audio decoder client, a host central processing unit (CPU) or host processor. The clients 106, ..., 110 may be coupled or interconnected via the bus 132. The bus 132 may also couple the SoC 102 to the memory 104 and may be utilized by the clients 106, ..., 110 to acquire information stored in the memory 104 for their own applications, such as data and multimedia processing applications.

The security check client 106 may comprise N number of process modules, 112, ..., 116, a master controller 118, a random number generator 124, a sample enable timer/counter 122, and a direct memory access (DMA) module 120.

Each of the process modules 112, ..., 116 may comprise suitable circuitry, logic, and/or code and may be adapted to monitor and/or verify data stored in one or more regions of the memory 104. The random number generator (RNG) 124 may comprise suitable circuitry, logic, and/or code and may be adapted to control the queue of access of the process modules 112, ..., 116. In this regard, the random number generator 124 may generate a random process index and may communicate an instruction 126 for randomly selecting one of the processes 112, ..., 116 for accessing and/or verifying data stored in the memory 104. Accordingly, at each sampling time, a randomly selected process may burst data into a process data buffer (not shown in FIG. 1a) for subsequent verification.

In addition, the random number generator 124 may be adapted to randomly allocate a time interval for each randomly selected process within the client 106. The randomly allocated time interval may be communicated via instruction 128 to the sample enable timer/counter 122. The timer/counter 122 may comprise suitable circuitry, logic, and/or code and may be adapted to countdown utilizing a time interval communicated from the random number generator 124. In an exemplary aspect of the invention, all randomly allocated time intervals for each of the process modules 112, ..., 116 may total a fixed duration.

The master controller 118 may comprise suitable circuitry, logic, and/or code and may be adapted to configure and control operation of the random number generator 124 and the process modules 112, ..., 116. The direct memory access module 120 may comprise suitable circuitry, logic, and/or code and may be adapted to provide direct access to data stored in the memory 104. The direct memory access module 120 may interrupt the master controller 118 to indicate a data request by one or more of the process modules 112, ..., 116, and/or transfer status information for each process module. Each of the process modules 112, ... 116 may be using the same or different security functions or digital signature verification algorithm (DSA) to verify data acquired from the memory 104. For example, each of the process modules 112, ..., 116 may utilize a Rivest-Shamir-Adelman (RSA) algorithm and/or a secure hash algorithm (SHA-1) to verify acquired data.

In operation, the master controller 118 within the security check client 106 may generate a command for the random number generator 124 to randomize the ordering of the process modules 112, ..., 116 within the client 106. After randomization, the process index ordering 1, ..., N may be randomized and a process module may be selected according to the randomized process index. The master controller 118 may then instruct the random number generator to generate a countdown value for the timer/counter 122. The timer/counter 122 may then count down to zero, and after the countdown is complete, the direct memory access module 120 may be utilized to access and fetch data from the memory 104. Accessed data may be fetched and stored in a buffer of the selected process for processing. This cycle may repeat until all N of the process modules 112, ..., 116 are served. If more data has to be verified by the security check client 106, the same procedure may be repeated until verifications are complete.

In an exemplary aspect of the invention, the data burst length for each data access by each of the process modules 112, ..., 116 within the client 106 may be selected in such a way that it may emulate the data burst length of other clients, such as clients 108, ..., 110, within the SoC 102. Further, unauthorized data access by an attacker 130 via the bus 132 may be prevented by utilizing the random number generator 124 to randomize which process module within the security check client 106 may access data stored in the memory 104. The random number generator 124 may also be utilized to randomly allocate a time interval for each process module. After each time interval has elapsed, the randomly selected data process may access the memory 104 via the direct memory access module 120.

Figure 1B:
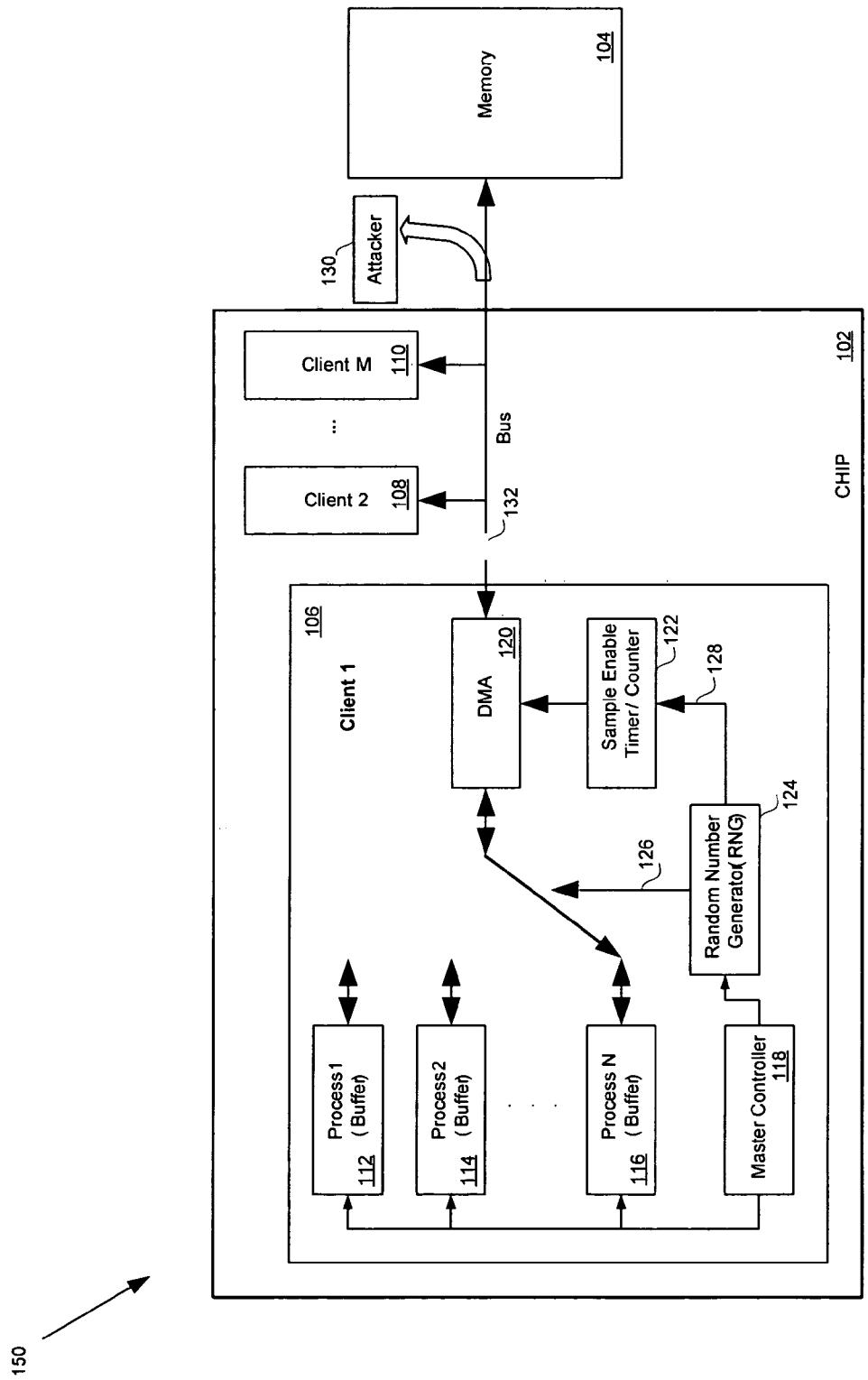
FIG. 1b is a block diagram illustrating the exemplary system of FIG. 1a securely handling processing of information, in accordance with an embodiment of the invention.

FIG. 1b is a block diagram illustrating the exemplary system of FIG. 1a securely handling processing of information, in accordance with an embodiment of the invention. Referring to FIG. 1b, the random number generator 124 may be adapted randomly allocate on the chip 102 a time interval for each of the process modules 112, ..., 116 so that a total of all time intervals randomly allocated for each of the data process modules 112, ..., 116 may comprise a fixed duration.

In an exemplary aspect of the invention, the random number generator 124 may be adapted to randomly allocate individual time intervals for the first (N−1) process modules within the chip 102 so that a total of the (N−1) individual time intervals is smaller than the fixed duration.

In operation, the process module 116 may be selected by the direct memory access module 120 as the last data processing module within the client 106. The random number generator 124 may calculate a total of all randomly allocated individual time intervals for all previously selected (N−1) process modules. The random number generator 124 may then calculate a time interval for the last process module 116 by subtracting the total of all randomly allocated individual time intervals for all previously selected (N−1) process modules from the fixed duration.

The calculated time interval for the process module 116 may then be communicated via instruction 128 to the sample enable timer/counter 122. The timer/counter 122 may comprise suitable circuitry, logic, and/or code and may be adapted to countdown utilizing the time interval communicated from the random number generator 124. After the countdown by the timer/counter 122 has completed, the direct memory access module 120 may access data stored in the memory 104 for further processing and verification by the process module 116.

Figure 2:
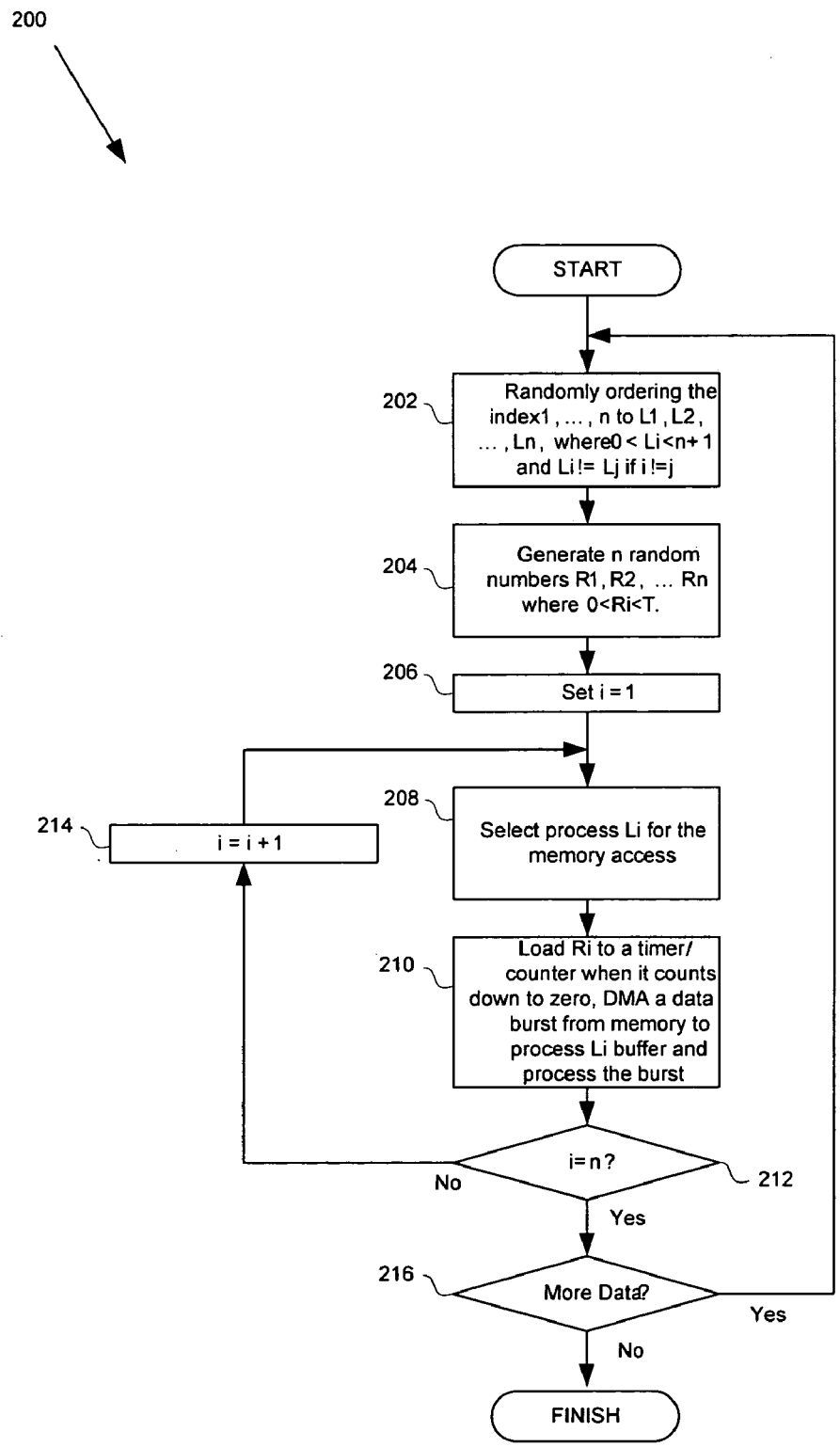
FIG. 2 is a flow diagram illustrating exemplary steps for processing information in an on-chip client, in accordance with an embodiment of the invention.

FIG. 2 is a flow diagram 200 illustrating exemplary steps for processing information in an on-chip client, in accordance with an embodiment of the invention. Referring to FIG. 2, at 202, an index [1, ..., n] may be randomly ordered to $[L_1, \ldots, L_n]$, respectively, where $[L_1, \ldots, L_n]$ may comprise n number of processes within an on-chip client. At 204, n random numbers $R_1, \ldots, R_n$ may be generated, where it is true for each of the n generated random numbers that $0 < R_i < T$. At 206, index i may be set to 1. At 208, process $L_i$ may be selected for memory access and data verification within the on-chip client. At 210, $R_i$ may be loaded to a timer/counter.

After the timer/counter counts down to zero, a data burst may be utilized to access the outside memory and may fetch data to process $L_i$.

The fetched data may then be buffered, for example, in a buffer for the process $L_i$, and then subsequently processed. At 212, it may be determined whether i=n. If i is not equal to n, i may be incremented at 214 and the cycle of steps 208, 210, and 212 may be repeated. After the last process has acquired data and i=n, at 216, it may be determined whether there is more data to be verified by the on-chip client. If more data needs to be verified by the on-chip client, the exemplary steps may start again at step 202.

Figure 3:
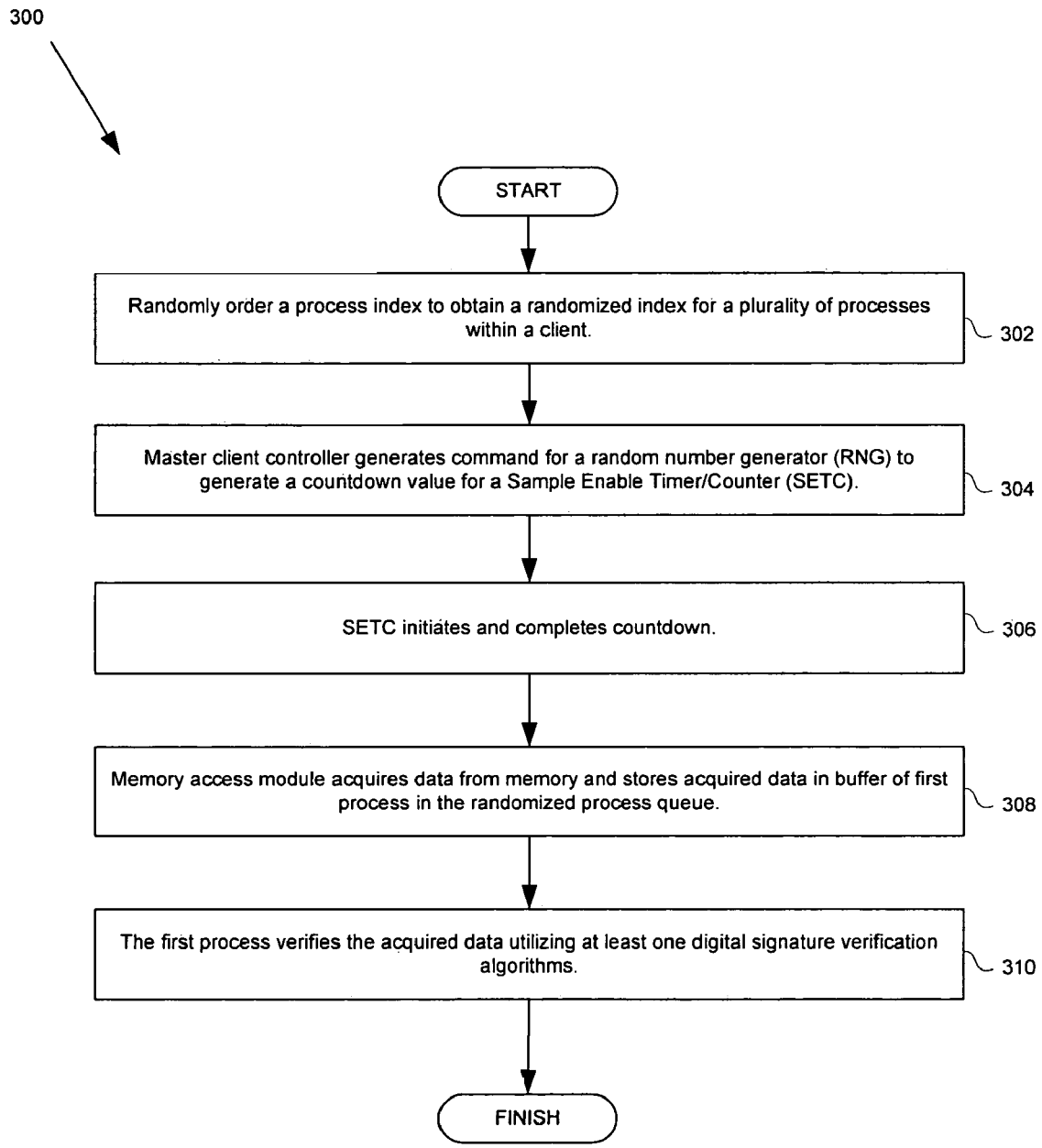
FIG. 3 is a flow diagram illustrating more detailed exemplary steps for processing of information in an on-chip client, in accordance with an embodiment of the invention.

FIG. 3 is a flow diagram 300 illustrating more detailed exemplary steps for processing information in an on-chip client, in accordance with an embodiment of the invention. Referring to FIG. 3, at 302, a process index may be randomly generated to obtain a randomized index for a plurality of processes within an on-chip client. At 304, a master client controller, or a client CPU, may instruct a random number generator, for example, within the client to generate a countdown value. The countdown value may then be communicated to a sample enable timer/counter.

At 306, the sample enable timer/counter may initiate and complete countdown utilizing the countdown value generated by the random number generator. At 308, a memory access module, such as a direct memory access module, may acquire data from memory and may store the acquired data in a buffer of a first process in the randomized process queue of processes within the on-chip client. At 310, a first process may verify the acquired data utilizing at least one digital signature verification algorithm. For example, the first process may utilize a Rivest-Shamir-Adelman (RSA) algorithm and/or a secure hash algorithm (SHA-1).

Figure 4:
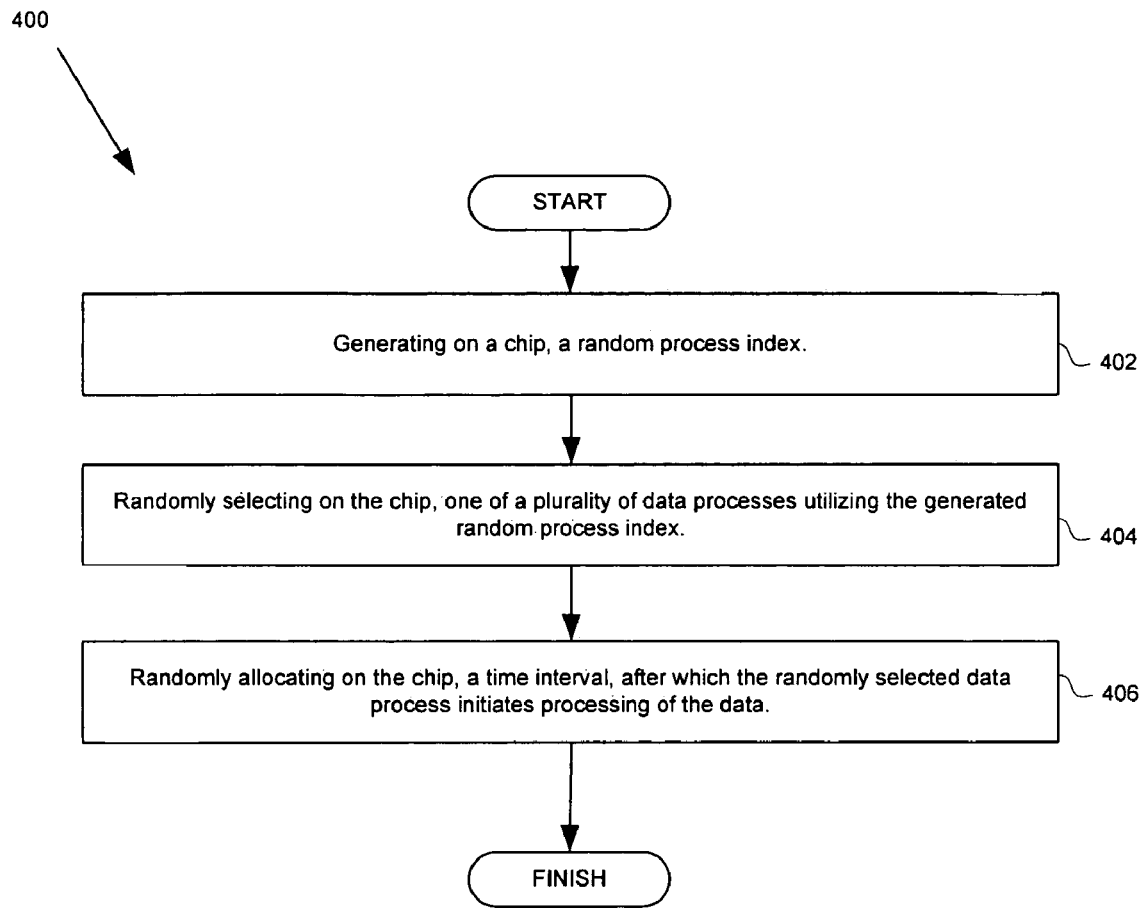
FIG. 4 is a flow diagram illustrating exemplary steps for securely handling processing of information, in accordance with an embodiment of the invention.

FIG. 4 is a flow diagram 400 illustrating exemplary steps for securely handling processing of information, in accordance with an embodiment of the invention. Referring to FIG. 4, at 402, a random process index may be generated on a chip. At 404, one of a plurality of data processes may be randomly selected on the chip, utilizing the generated random process index. At 406, a time interval may be randomly allocated on the chip. After the randomly allocated time interval has elapsed, the randomly selected data process within the on-chip client may initiate processing of the data. The processing of the data may comprise accessing the data stored in memory via a bus and/or fetching data stored in memory to the randomly selected data process for further verification.

Referring again to FIG. 1a, in an exemplary aspect of the invention, a system 100 for securely handling processing of information may comprise a random number generator 124 that generates on a chip 102, a random process index. A direct memory access module 120 may be utilized to randomly select on the chip 102, one of a plurality of N data process modules 112, ..., 116 utilizing the generated random process index. In addition, the random number generator 124 may be adapted to randomly allocate on the chip 102, a time interval for each of the process modules 112, ..., 116. After the direct memory access module 120 randomly selects one of the data processes 112, ..., 116, the timer/counter 122 may be utilized to countdown from the randomly allocated time interval for the selected process.

Once the countdown by the timer/counter 122 is complete, the randomly selected process module may initiate processing of data. The processing of the data may comprise accessing the data stored in memory 104 and/or acquiring the data from memory 104. The burstiness of the data acquired by any of the process modules 112, ..., 116 in client 106 may be approximately equal to burstiness of data acquired by a plurality of clients, 108, ..., 110, on the chip 102.

The randomly selected data process module may be adapted to verify the data prior to the processing of the data utilizing one or more digital signature verification algorithms. For example, the randomly selected data process module may utilize a Rivest-Shamir-Adelman (RSA) algorithm and/or a secure hash algorithm (SHA-1) to verify data acquired from the memory 104.

The random number generator 124 may randomly allocate on the chip 102 a time interval for each of the process modules 112, ..., 116 so that a total of all time intervals randomly allocated for each of the data process modules 112, ..., 116 may comprise a fixed duration. The direct memory access module 120 may be adapted to randomly select on the chip 102, a subsequent data process module from the N data process modules 112, ..., 116, utilizing a subsequently generated random process index. The random number generator 124 may be adapted to randomly allocate on the chip, a subsequent time interval.

The randomly allocated subsequent time interval may be communicated to the timer/counter 122 for countdown. After countdown has completed, the randomly selected subsequent data process module may acquire subsequent data. The randomly allocated subsequent time interval may comprise at least a remaining portion of the fixed duration. Further, the randomly selected subsequent data process may initiate processing of the subsequent data after the randomly selected data process module completes the processing of the data. Such data processing cycle may repeat until all process modules 112, ..., 116 within the chip 102 have completed data access and verification of data stored in the memory 104.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for securely handling processing of information, the method comprising:
    generating on a chip, a random process index;
    randomly selecting on said chip, one of a plurality of data processes using said generated random process index; and
    randomly allocating on said chip, a time interval, after which said randomly selected one of said plurality of data processes initiates processing of data.

2. The method according to claim 1, wherein said processing of said data comprises one or both of accessing said data and/or acquiring said data.

3. The method according to claim 1, comprising verifying said data by said selected one of said plurality of data processes prior to said processing of said data.

4. The method according to claim 3, comprising verifying said data utilizing at least one digital signature verification algorithm.

5. The method according to claim 4, wherein said at least one digital signature verification algorithm comprises one or both of a Rivest-Shamir-Adelman (RSA) algorithm and/or a secure hash algorithm (SHA-1).

6. A system for securely handling processing of information, the system comprising:
    a random number generator that enables generation on a chip, of a random process index;
    a memory access module that enables random selection on said chip, of one of a plurality of data processes using said generated random process index; and
    said random number generator enables random allocation on said chip, of a time interval, the occurrence of which enables said randomly selected one of said plurality of data processes to initiate processing of data.

7. The system according to claim 6, wherein said processing of said data comprises one or both of accessing said data and acquiring said data.

8. The system according to claim 6, wherein said selected one of said plurality of data processes verifies said data prior to said processing of said data.

9. The system according to claim 8, wherein said selected one of said plurality of data processes verifies said data utilizing at least one digital signature verification algorithm.

10. The system according to claim 9, wherein said at least one digital signature verification algorithm comprises one or both of a Rivest-Shamir-Adelman (RSA) algorithm and/or a secure hash algorithm (SHA-1).

11. A system for securely handling processing of information, the system comprising:
    one or more circuits that enables generation on a chip, of a random process index;
    said one or more circuits enables random selection on said chip, of one of a plurality of data processes using said generated random process index; and
    said one or more circuits enables random allocation on said chip, of a time interval, the occurrence of which enables said randomly selected one of said plurality of data processes to initiate processing of data.

12. The system according to claim 11, wherein said processing of said data comprises one or both of accessing said data and/or acquiring said data.

13. The system according to claim 11, wherein said selected one of said plurality of data processes verifies said data prior to said processing of said data.

14. The system according to claim 13, wherein said selected one of said plurality of data processes verifies said data utilizing at least one digital signature verification algorithm.

15. The system according to claim 14, wherein said at least one digital signature verification algorithm comprises one or both of a Rivest-Shamir-Adelman (RSA) algorithm and/or a secure hash algorithm (SHA-1).

16. A method for securely handling processing of information, the method comprising:
    generating on a chip, a random process index;
    randomly selecting on said chip, one of a plurality of data processes using said generated random process index; and
    randomly allocating on said chip, a time interval, after which said randomly selected one of said plurality of data processes initiates processing of data, wherein said processing of said data comprises one or both of accessing said data and/or acquiring said data, and wherein burstiness of said data is approximately equal to burstiness of data acquired by a plurality of clients on said chip.

17. A system for securely handling processing of information, the system comprising:
    a random number generator that enables generation on a chip, of a random process index;
    a memory access module that enables random selection on said chip, of one of a plurality of data processes using said generated random process index; and
    said random number generator enables random allocation on said chip, of a time interval, the occurrence of which enables said randomly selected one of said plurality of data processes to initiate processing of data, wherein said processing of said data comprises one or both of accessing said data and/or acquiring said data, and wherein burstiness of said data is approximately equal to burstiness of data acquired by a plurality of clients on said chip.

18. A system for securely handling processing of information, the system comprising:
    one or more circuits that enables generation on a chip, of a random process index;
    said one or more circuits enables random selection on said chip, of one of a plurality of data processes using said generated random process index; and
    said one or more circuits enables random allocation on said chip, of a time interval, the occurrence of which enables said randomly selected one of said plurality of data processes to initiate processing of data, wherein said processing of said data comprises one or both of accessing said data and/or acquiring said data, and wherein burstiness of said data is approximately equal to burstiness of data acquired by a plurality of clients on said chip.

19. A method for securely handling processing of information, the method comprising:
  generating on a chip, a random process index;
  randomly selecting on said chip, one of a plurality of data processes using said generated random process index; and
  randomly allocating on said chip, a time interval, after which said randomly selected one of said plurality of data processes initiates processing of data, wherein a total of a plurality of random time intervals allocated for each of said plurality of data processes comprises a fixed duration.

20. The method according to claim 19, comprising randomly selecting on said chip, a subsequent one of said plurality of data processes using a subsequently generated random process index.

21. The method according to claim 20, comprising randomly allocating on said chip, a subsequent time interval, after which said randomly selected subsequent one of said plurality of data processes acquires subsequent data, wherein said subsequent time interval comprises at least a remaining portion of said fixed duration.

22. The method according to claim 21, wherein said subsequent one of said plurality of data processes initiates processing of said subsequent data after said randomly selected one of said plurality of data processes completes said processing of said data.

23. A system for securely handling processing of information, the system comprising:
  a random number generator that enables generation on a chip, of a random process index;
  a memory access module that enables random selection on said chip, of one of a plurality of data processes using said generated random process index; and
  said random number generator enables random allocation on said chip, of a time interval, the occurrence of which enables said randomly selected one of said plurality of data processes to initiate processing of data, wherein a total of a plurality of random time intervals allocated for each of said plurality of data processes comprises a fixed duration.

24. The system according to claim 23, wherein said memory access module enables random selection on said chip, of a subsequent one of said plurality of data processes using a subsequently generated random process index.

25. The system according to claim 24, wherein said random number generator enables random allocation on said chip, of a subsequent time interval, after which said randomly selected subsequent one of said plurality of data processes acquires subsequent data, wherein said subsequent time interval comprises at least a remaining portion of said fixed duration.

26. The system according to claim 25, wherein said subsequent one of said plurality of data processes initiates processing of said subsequent data after said randomly selected one of said plurality of data processes completes said processing of said data.

27. A system for securely handling processing of information, the system comprising:
  one or more circuits that enables generation on a chip, of a random process index;
  said one or more circuits enables random selection on said chip, of one of a plurality of data processes using said generated random process index; and
  said one or more circuits enables random allocation on said chip, of a time interval, the occurrence of which enables said randomly selected one of said plurality of data processes to initiate processing of data, wherein a total of a plurality of random time intervals allocated for each of said plurality of data processes comprises a fixed duration.

28. The system according to claim 27, wherein said one or more circuits enables random selection on said chip, of a subsequent one of said plurality of data processes using a subsequently generated random process index.

29. The system according to claim 28, wherein said one or more circuits enables random allocation on said chip, of a subsequent time interval, after which said randomly selected subsequent one of said plurality of data processes acquires subsequent data, wherein said subsequent time interval comprises at least a remaining portion of said fixed duration.

30. The system according to claim 29, wherein said subsequent one of said plurality of data processes initiates processing of said subsequent data after said randomly selected one of said plurality of data processes completes said processing of said data.

* * * * *

UNITED STATES PATENT AND TRADEMARK OFFICE
CERTIFICATE OF CORRECTION

| | | |
|---|---|---|
| PATENT NO. | : 7,743,977 B2 | Page 1 of 1 |
| APPLICATION NO. | : 11/069204 | |
| DATED | : June 29, 2010 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this
Twenty-fifth Day of January, 2011

David J. Kappos
*Director of the United States Patent and Trademark Office*